United States Patent [19]

Endo

[11] Patent Number: 5,984,256
[45] Date of Patent: *Nov. 16, 1999

[54] MOLD AND METHOD FOR MANUFACTURING AN INORGANIC BOARD

[75] Inventor: Atsushi Endo, Chita, Japan

[73] Assignee: Nichiha Corporation, Aichi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/967,203

[22] Filed: Oct. 29, 1997

Related U.S. Application Data

[63] Continuation of application No. 08/650,001, May 16, 1996, abandoned, which is a continuation of application No. 08/265,069, Jun. 28, 1994, abandoned.

[51] Int. Cl.[6] .................................................. B29C 33/38
[52] U.S. Cl. ........................................ 249/114.1; 249/134
[58] Field of Search ................................ 249/114.1, 115, 249/134

[56] References Cited

U.S. PATENT DOCUMENTS

| | | | |
|---|---|---|---|
| 3,291,436 | 12/1966 | Berghammer | 249/114.1 |
| 3,317,178 | 5/1967 | Kreier | 249/115 |
| 4,559,270 | 12/1985 | Sara | 249/114.1 |
| 4,798,364 | 1/1989 | Scott | 249/114.1 |
| 4,834,929 | 5/1989 | Dehoff et al. | 249/115 |
| 4,919,388 | 4/1990 | Koike et al. | 249/114.1 |
| 4,935,085 | 6/1990 | Maruyama et al. | 249/114.1 |
| 5,094,607 | 3/1992 | Masters | 249/114.1 |

FOREIGN PATENT DOCUMENTS

| | | | |
|---|---|---|---|
| 2071050 | 9/1971 | France | 249/115 |
| 2152423 | 6/1973 | Germany | 249/114.1 |
| 3410751 | 9/1975 | Germany | 249/114.1 |
| 43-12910 | 5/1965 | Japan | 249/114.1 |
| 45-23386 | 8/1970 | Japan | 249/115 |

OTHER PUBLICATIONS

Perry's Chemical Engineers' Handbook, 6th Edition, pp. 23–39, 1984.
Hodgman, C.D. "Handbook of Chemistry and Physics", pp. 1772–1773, Chemical Rubber Publishing Co.; 1949.

*Primary Examiner*—James P. Mackey
*Attorney, Agent, or Firm*—Donald S. Dowden; Cooper & Dunham LLP

[57] ABSTRACT

A mold used for manufacturing an inorganic board and a method of manufacturing an inorganic board by employing said mold are provided in the present invention. Said mold consists of a mold part made of a fiber reinforced plastic and a metal part attached to the back of said mold part, and because of said metal part, the difference in the coefficient of thermal expansion between said mold and an inorganic board manufactured on said mold is small.

5 Claims, 3 Drawing Sheets

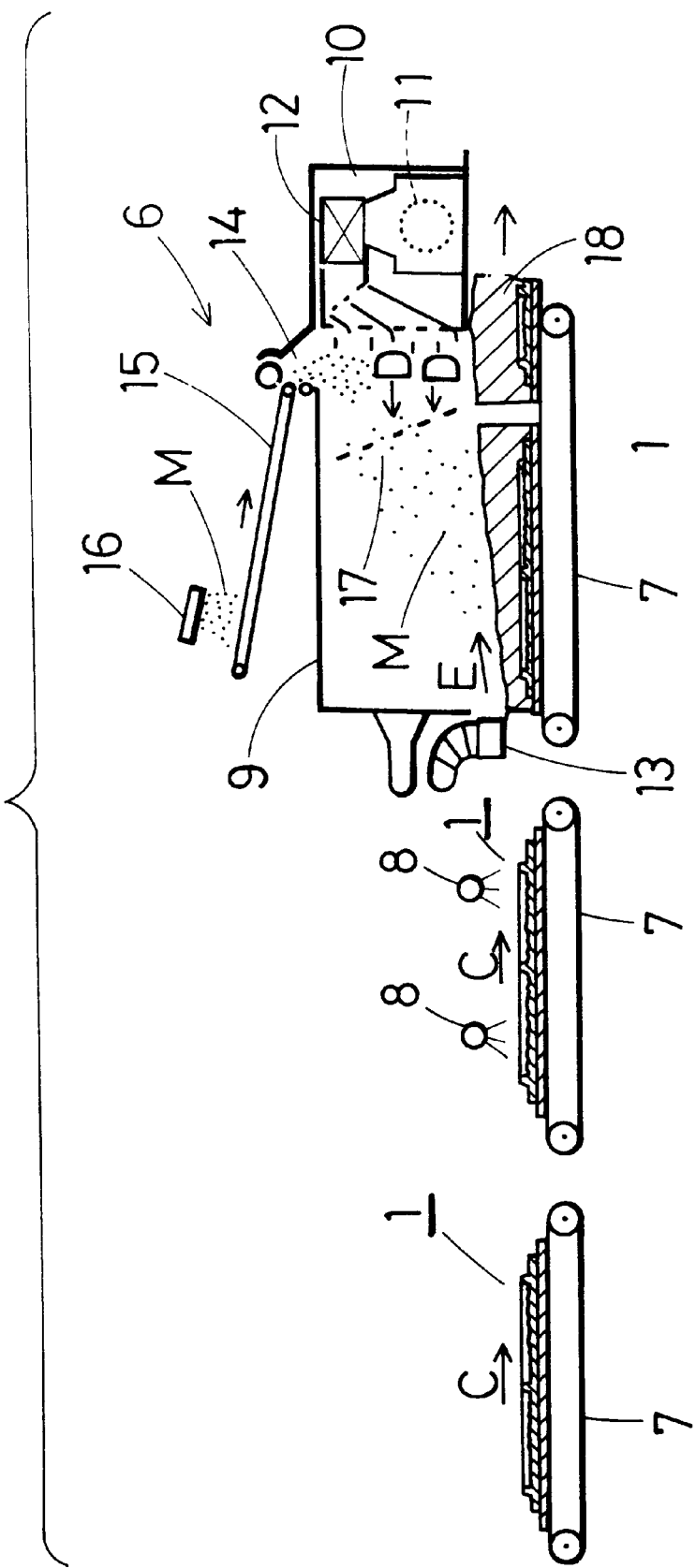

MOLD AND METHOD FOR MANUFACTURING AN INORGANIC BOARD

This is a continuation of application Ser. No. 08/650,001, filed May 16, 1996, now abandoned, which was a continuation of application Ser. No. 08/265,069, filed Jun. 28, 1994, now abandoned.

FIELD OF THE INVENTION

The present invention relates to a mold and a method of manufacturing an inorganic board by employing said mold. Said inorganic board is used as a building material.

DESCRIPTION OF THE PRIOR ART

At present, the semi-dry method is provided to manufacture the inorganic board. Said method comprises strewing a cement-reinforcing wood material mixture onto a mold to form a mat, pressing said mat to pre-harden said mat, and incubating said pre-hardened mat. Generally, said mold has an embossed surface to give a corresponding embossed design to the surface of the resulting inorganic board.

Hitherto, a mold made of a fiber reinforced plastic has been provided for said semi-dry method. Nevertheless, because of the remarkable difference in the coefficient of thermal expansion between the inorganic board and said mold, slippage of the interface between the inorganic board and said mold is caused and said slippage causes the embossed design of said inorganic board to become warped.

SUMMARY OF THE INVENTION

Accordingly, an object of the present invention is to provide a mold having a coefficient of thermal expansion substantially equal to an inorganic board manufactured on said mold.

Another object of the present invention is to provide an inorganic board having a clear embossed design, without being warped, manufactured by employing said mold.

Said object may be attained to provide a mold comprising a mold part made of a fiber reinforced plastic and a metal part attached to the back of said mold part, and a method of manufacturing an inorganic board comprising strewing a cement-reinforcing wood material mixture onto said mold to form a mat, pressing said mat to pre-harden said mat, and incubating said pre-hardened mat.

BRIEF DESCRIPTION OF THE DRAWINGS

FIG. 1 to FIG. 4 relate to an embodiment of the mold.

FIG. 1 is a plane view of said mold.

FIG. 2 is a partial sectional view along line A—A.

FIG. 3 is a sectional view along line B—B.

FIG. 4 is a diagram of an embodiment of the forming machine.

DETAILED DESCRIPTION OF THE INVENTION

Figure 1:
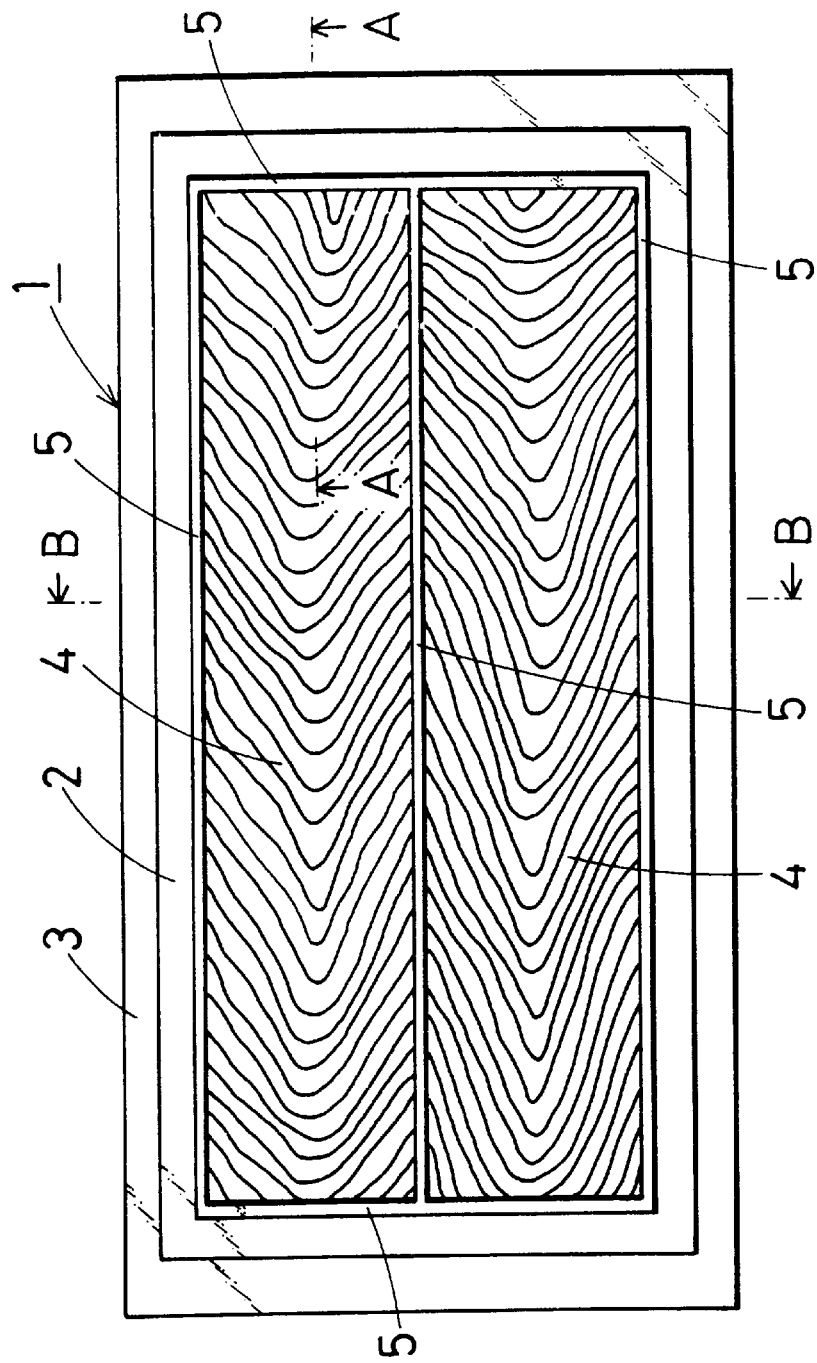
Figure 2:
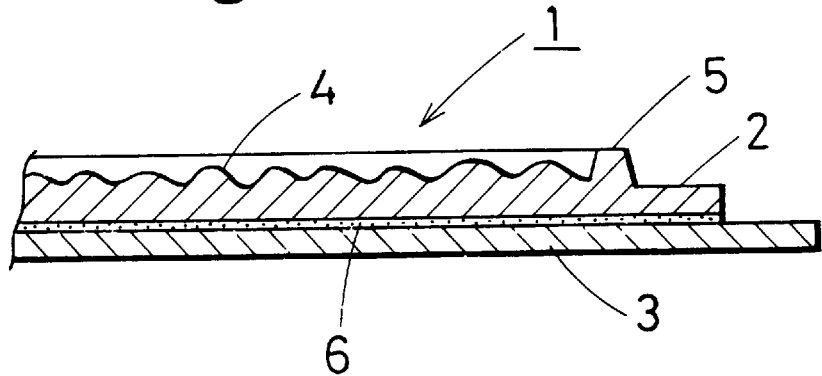
Figure 3:
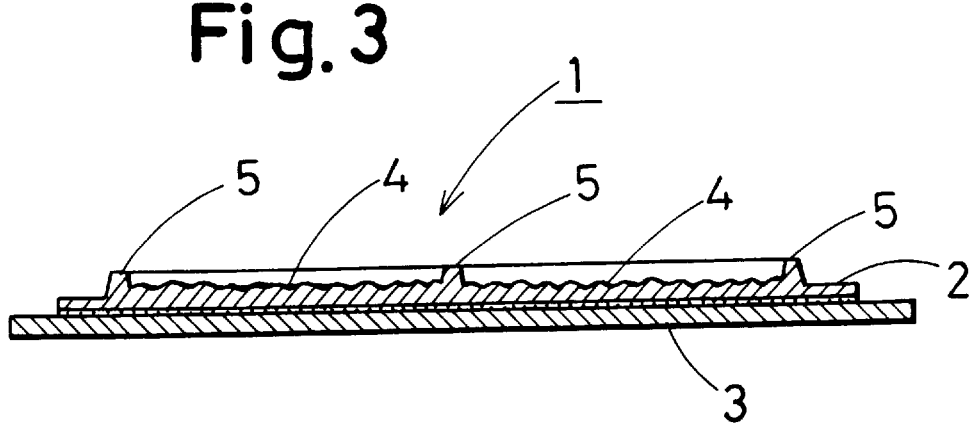

FIG. 1 to FIG. 3 relate to an embodiment of a mold of the present invention. Referring now to the Figures, a mold (1) consists of a mold part (2) made of a fiber reinforced plastic (FRP) and a metal part (3) attached to the back of said mold part (2).

Said fiber reinforced plastic (FRP) is made of a plastic and a fiber mixed in said plastic. Said plastic is such as a hardened unsaturated polyester, a hardened mixture of unsaturated polyester and styrene, a hardened diallylphatalate, a hardened urea resin, a hardened melamine resin, a hardened phenol resin, a hardened epoxy resin, and the like. Further, said fiber is such as glass fiber, carbon fiber, ceramic fiber, polyester fiber, polyamide fiber, acryl fiber, polyethylene fiber, polypropylene fiber, acetate fiber, and the like.

Said metal part (3) is made of a metal such as iron, aluminum, copper, and the like or an alloy such as a steel, a stainless steel, brass, and the like, and the coefficient of linear expansion of said metal or alloy is preferably in the range between $10 \times 10^{-6}$ to $30 \times 10^{-6}$.

It is preferable to use an elastic adhesive to attach said metal part (3) to said mold part (2) since said elastic adhesive is easy to follow the thermal deformations of said mold part (2) and said metal part (3).

Said elastic adhesive is made of a synthetic rubber such as acryl rubber, isobutylene-isoprene rubber, silicone rubber, urethane rubber, polysulfide rubber, graft rubber, polybutadiene rubber, polyisoprene rubber, polychloroprene rubber, polyisobutylene rubber, polybutene rubber, isobutene-isoprene rubber, acrylate-butadiene rubber, styrene-butadiene rubber, acrylonitrile-butadiene rubber, pyridine-butadiene rubber, styrene-isoprene rubber, acrylonitrile-chloroprene rubber, styrene-chloroprene rubber and the like, natural rubber, and/or an elastomer such as styrene-butadiene-styrene (SBS) copolymer, styrene-isoprene-styrene (SIS) copolymer, styrene-etylene-butylene-styrene (SEBS) copolymer, fluoroestomer and the like.

Said mold (1) has an embossed surface (4) and further longitudinal and horizontal guide ribs (5) are formed on said surface (4). Instead of said guide ribs (5), guide grooves may be formed on said surface (4).

To manufacture an inorganic board by employing the semi-dry method, a cement-reinforcing wood material mixture is strewed on said mold (1) in the first process (Forming process). Said mixture substantially consists of a cement, a reinforcing wood material and an aggregate. Said cement is such as Portland cement, blast furnace cement, fly ash cement, silica cement, alumina cement, and the like. Further, said reinforcing wood material is such as wood powder, wood flake, wood pulp, wood fiber, bundled wood fiber, bamboo fiber, hemp fiber, palm fiber, bagasse, rice straw, wheat straw chaff, and the like. A bulky bundled wood fiber being branched and/or curved and/or bent is a preferable reinforcing wood material since said reinforcing wood material gives a porous but strong structure to the resulting inorganic board. Said bulky bundled wood fiber is disclosed in U.S. Pat. No. 5,188,889. A wood flake is another preferable reinforcing wood material. Said wood flake is made by slicing a wood chip and a preferable wood flake has a width in the range between 0.5 to 4 mm, a length in the range between 1 to 30 mm and an aspect ratio in the range between 5 to 60. Said reinforcing wood material is generally mixed in said cement-reinforcing wood material mixture in the amount of 10 to 35% by weight as a dried fiber to the total solid included in said mixture.

Said aggregate is such as a silica sand, a silica powder, a silica fume, a silas balloon, a pearlite, an expansive shale, an expansive clay, burned diatomaceous earth, fly ash, blast furnace slag, gypsum powder, sludge ash, coal cinders, and the like. Said aggregate is generally mixed in said cement-reinforcing wood material mixture in the amount of 5 to 15% by weight to the total solid included in said mixture.

Further, if desirable, a hardening promoter such as magnesium chloride, magnesium sulfate, calcium chloride, calcium sulfate, sodium aluminate, potassium aluminate, aluminum sulfate, water glass, and the like, a waterproof agent or water-repellent agent such as wax, paraffin, silicone, a surface active agent, and the like, plastic material such as expandable polystyrene beads, expandable polyethylene beads, expandable polypropylene beads, expanded polystyrene beads, expanded polyethylene beads, expanded polypropylene beads, polystyrene foam, polyethylene foam, polypropylene foam, and the like, is added.

In the forming process, said mixture is prepared in a mixing machine and when said mixture is prepared, the water content of said mixture is adjusted to about 40 to 50% by weight and preferably said mixture is heated at a temperature in the range between about 40 to 70 ° C. by steam to avoid a deflection of the hardening of said mixture depending on the changes of the seasons.

To strew said mixture on said mold such as a forming machine (6) shown in FIG. 4 is employed. Referring to FIG. 4, said molds (1) are transported on a conveyer (7) in the direction showen by arrow C and a release agent is coated on the surface of said molds (1) respectively by spray guns (8), (8), and then said molds (1) are guided into said forming machine (6).

Said forming machine (6) comprises a forming chamber (9), a ventilation chamber (10) which is arranged on the exit side of said forming chamber (9) and a ventilator (11) and a heater (12) are installed in said ventilation chamber (10), a reverse ventilator (13) which is arranged in the entrance side of said forming chamber (9) being opposite to said ventilator (11) in said ventilation chamber (10), a hopper (14) arranged in the ceiling of said forming chamber (9), a conveyer (15) connecting to said hopper (14) to supply said cement-reinforcing wood material mixture M onto said hopper (14), a sieve (16) arranged above said conveyer (15) to strew said mixture M onto said conveyer (15), and a distributing panel (17) arranged in front of said ventilation chamber (10).

Said mixture M is strewed onto said conveyer (15) to put said mixture M in said hopper (14) and then said mixture M is strewed from said hopper (14) onto said mold (1) to form a mat (18) in said forming chamber (9).

During the strewing of said mixture M, the air is heated to a temperature in the range between about 30 to 60° C. by said heater (12) and is blown against said mixture M being strewed.

Thus said mixture M is distributed by said distributing panel (17) showen by arrow D and accumulates on said mold (1) to form a mat (18). Since said mixture M is sorted depending on the particle size of said reinforcing wood material in said mixture M by the blown air as above described, the mixture M including the finer reinforcing wood material is arranged in the lower part of the resulting mat (18) and the mixture M including the more coarse reinforcing wood material is arranged in the upper part of the resulting mat (18).

As said mixture M is heated by air heated to a temperature in the range between about 30 to 60° C. during streweing this avoids deflection of the hardening of said mixture depending on the changes of the seasons.

Further, said air is blown against said mixture M being strewed from said reverse ventilator (13) in the direction showen by arrow E to guide and to accumulate said mixture M on the dead space of said mold (1) from said ventilator (11).

The resulting mat (18) formed by the above described forming process has a structure where the lower part of said mat (18) has a high density and the upper part of said mat (18) has a low density.

In the present invention, a mat having two or more layers in its structure may be also formed. In such a case, where a mat having a two layer structure is formed, in the first forming stage, a mixture $M_1$ including fine reinforcing wood material is strewed on said mold and in the second forming stage, a mixture $M_2$ including coarse reinforcing wood material is strewed on the resulting layer of the first forming stage.

Further, in the present invention, it is not always necessary to heat the air blown against said mixture M being strewed.

The resulting mat (18) is then pressed if desirable with heating to pre-harden said mat (18). If desirable, two or more mats (18) may be laminated before said press process. In a case where two mats (18) are laminated, it is preferable to laminate said mats (18) by contacting the upper side of each mat (18). As above described, the lower part of said mat (18) has a high density and the upper part of said mat (18) has a low density, and in a case where two mats (18) are laminated by contacting the upper side of each mat (18), both surface layers of the resulting inorganic board will consist of lower layers of said mats (18) and a core layer of the resulting inorganic board consists of the upper layers of said mats (18). Accordingly, in this case, an inorganic board having high density surface layers and a low density core layer is manufactured. Since said inorganic board has high density and rigid surface layers and a low density and an elastic core layer, a clear embossed design can be formed on the surface of said inorganic board by pressing with said mold (1). In said pressing process, generally, 2.6 to 5.1 MPa of pressure is employed.

During said pressing process, said mixture M in said mat (18) is pre-hardened and the resulting pre-hardened mat (18) is then incubated. In the incubation process, said pre-hardened mat (18) may be removed from said mold (1) or said pre-hardened mat (18) may be incubated with said mold In said incubation process, generally, a humidity in the range between about 85 to 95% RH, a temperature in the range between about 50 to 80° C., an incubation time in the range between about 8 to 10 hours are employed and during said incubation process, the pre-hardened mixture M in said mat (18) is almost completely hardened.

Figure 5:
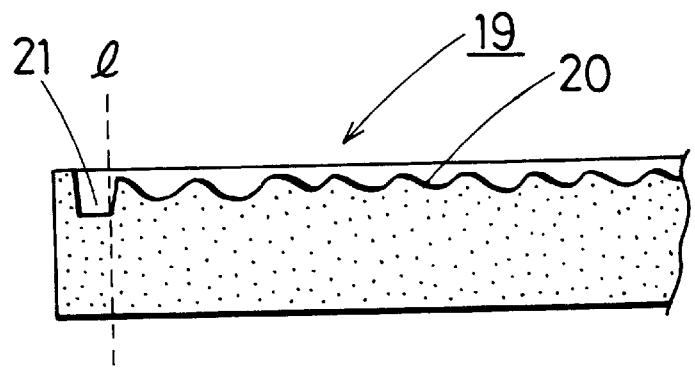
FIG. 5 is a partial sectional view of an inorganic board.

After said incubation process, if desirable, the resulting inorganic board (19) shown in FIG. 5 is removed from said mold (1) and said inorganic board (19) has an embossed design (20) formed by the embossed surface (4) of said mold (1) and guide grooves (21) formed by the guide ribs (5) on the surface. Then said inorganic board (19) is cut to a suitable size along said guide grooves (21) as shown by the dotted line 1 in FIG. 5.

EXAMPLE 1

A mold A used in EXAMPLE 1 consists of a mold part (2) made of an FRP and a metal part (3) made of a steel as shown in FIG. 1 to FIG. 3.

As a comparison, a mold B made of an FRP was prepared. The coefficients of linear expansion of FRP, steel, and the mold A in said example and the mold B in comparison are shown in Table 1.

TABLE 1

| | Coefficient of Linear Expansion |
|---|---|
| FRP | $55.1 \times 10^{-6}/°$ C. |
| Steel | $11.8 \times 10^{-6}/°$ C. |
| Mold A | $23.6 \times 10^{-6}/°$ C. |
| Mold B | $55.1 \times 10^{-6}/°$ C. |

The formulation of the mixture used in EXAMPLE 1 is as follows;

| | |
|---|---|
| Portland cement | 60 parts by weight |
| Wood flake | 25 parts by weight |
| Magnesium chloride | 1.2 parts by weight |
| Paraffin | 1.0 parts by weight |
| Water | 40 parts by weight |

Using said mixture M and the mold A and the mold B, inorganic boards A and B were manufactured by the method in the above described embodiment. The coefficient of linear expansion of the resulting inorganic boards are respectively $25.0 \times 10^{-6}/°$ C. and the condition of the embossed design of each inorganic board A or B was observed. As a result, the inorganic board A manufactured by employing the mold A had a clear embossed design since the difference of the coefficient of linear expansion between the inorganic board A and the mold A is small while the inorganic board B manufactured by employing the mold B had a little warped embossed design since the difference of the coefficient of the linear expansion between the inorganic board B and the mold B is large.

EXAMPLE 2

A mold C used in EXAMPLE 2 consisted of a mold part (2) made of an FRP and a metal part (3) made of aluminium, the coefficients of linear expansion of said FRP, said aluminium, and said mold C are shown in Table 2.

TABLE 2

| | Coefficient of Linear Expansion |
|---|---|
| FRP | $55.1 \times 10^{-6}/°$ C. |
| Aluminium | $23.1 \times 10^{-6}/°$ C. |
| Mold C | $27.3 \times 10^{-6}/°$ C. |

An inorganic board C was manufactured by employing mold C and in the same method as EXAMPLE 1. The resulting inorganic board C had a clear embossed design.

EXAMPLE 3

A mold D used in EXAMPLE 3 consisted of a mold part (2) made of an FRP and a metal part (3) made of stainless steel. The coefficient of linear expansion of said FRP, said stainless steel, and said mold D are shown in Table 3

TABLE 3

| | Coefficient of Linear Expansion |
|---|---|
| FRP | $55.1 \times 10^{-6}/°$ C. |
| Stainless steel | $14.7 \times 10^{-6}/°$ C. |
| Mold D | $24.0 \times 10^{-6}/°$ C. |

An inorganic board D was manufactured by employing mold D and in the same method as EXAMPLE 1. The resulting inorganic board D had a clear embossed design.

We claim:

1. A mold comprising a rigid fiber-reinforced plastic layer having a molding surface, a back surface, and a coefficient of linear expansion of approximately $55.1 \times 10^{-6}/°$ C.; and a metal support fixed to said back surface and having a coefficient of linear expansion within the range of $10 \times 10^{-6}/°$ C. to $30 \times 10^{-6}/°$ C., thereby suppressing the linear coefficient of expansion of said rigid fiber-reinforced plastic layer and producing a mold having a coefficient of linear expansion within the range of $23.6 \times 10^{-6}/°$ C. to $27.3 \times 10^{-6}/°$ C.

2. A mold in accordance with claim 1 further comprising an adhesive attaching said metal support to the back surface of said fiber-reinforced plastic layer.

3. A mold in accordance with claim 1 wherein said molding surface is embossed.

4. A mold in accordance with claim 1 wherein said fiber-reinforced plastic layer is reinforced with fiber selected from the group consisting of glass fiber, carbon fiber, ceramic fiber, polyester fiber, polyamide fiber, acrylic fiber, polyolefin fiber and acetate fiber.

5. A mold in accordance with claim 1 wherein said plastic making up said reinforced plastic layer is selected from the group consisting of hardened unsaturated polyester, hardened admixture of unsaturated polyester and styrene, hardened diallylphthalate, a hardened urea resin, hardened melamine resin, hardened phenolic resin and hardened epoxy resin.

* * * * *